United States Patent [19]

Sease

[11] 4,073,458

[45] Feb. 14, 1978

[54] HANGER CLIP FOR DISPLAYING ARTICLES FROM SUSPENDED CEILINGS

[76] Inventor: True F. Sease, 10491 Air Hill Road, Brookville, Ohio 45309

[21] Appl. No.: 729,671

[22] Filed: Oct. 5, 1976

[51] Int. Cl.[2] ...................... F16M 13/00; A44B 17/00

[52] U.S. Cl. ........................................ 248/340; 52/39

[58] Field of Search .................. 248/317, 228, 226 E, 248/72, 340, 343, 339, 301, 304; 24/259 R, 259 TF, 201 S, 230 F; 52/484, 485, 489, 144, 49, 39, 28

[56] References Cited

U.S. PATENT DOCUMENTS

| | | | |
|---|---|---|---|
| 3,296,751 | 1/1967 | Heirich | 52/484 X |
| 3,343,329 | 9/1967 | Pohutsky | 52/489 X |
| 3,561,718 | 2/1971 | Iverson | 248/340 |
| 3,612,461 | 10/1971 | Brown | 248/317 |
| 3,743,228 | 7/1973 | Drab | 248/228 |
| 3,952,985 | 4/1976 | Davenport | 248/317 |

FOREIGN PATENT DOCUMENTS

| | | | |
|---|---|---|---|
| 2,252,773 | 6/1975 | France | 248/228 |
| 381,962 | 11/1964 | Switzerland | 248/340 |
| 954,982 | 4/1964 | United Kingdom | 52/484 |
| 1,326,166 | 8/1973 | United Kingdom | 248/228 |

*Primary Examiner*—J. Franklin Foss

*Attorney, Agent, or Firm*—Biebel, French & Nauman

[57] ABSTRACT

A hanger clip for attachment to suspended ceilings of the type having inverted T-shaped overhead beams for supporting ceiling panels is formed from a continuous thin elongated strip with a U-bend portion formed in approximately the middle of the strip having a depth at least sufficient to receive the horizontal flange of the overhead beam, a downwardly extending portion which has formed in the lower end thereof a means for attachment to an article to be displayed, and a vertically upright portion which is adapted to be placed between the vertical leg of the overhead beam and a ceiling panel installed on that beam to hold the hanger clip securely in place. In another embodiment, a pair of hanger clips are fastened together at their lower ends and then placed on opposite sides of the overhead beam.

7 Claims, 13 Drawing Figures

HANGER CLIP FOR DISPLAYING ARTICLES FROM SUSPENDED CEILINGS

BACKGROUND OF THE INVENTION

This invention relates to a hanger clip for displaying articles from a suspended ceiling of the type which includes a plurality of ceiling panels installed on overhead beams, each beam having a horizontal flange and a vertically upright leg.

Previous ceiling clips for this purpose have proved inadequate or deficient for several reasons. Some are too expensive to manufacture, other types of ceiling clips are not securely fastened to the overhead beam and might twist or drop off if the article which is being supported by the clip is bumped or twisted, and still other clips are difficult to install or require special tools for installation.

Prior art ceiling clips are illustrated in the following identified patents: U.S. Pat. Nos. 2,944,781; 3,561,718; 3,843,086 and 3,952,985.

SUMMARY OF THE INVENTION

This invention relates to a ceiling or hanger clip for displaying an article from a suspended ceiling, and specifically a ceiling of the type in which a plurality of ceiling panels are installed on and supported by overhead, inverted T-shaped beams, each beam having a lower horizontal flange and a vertically upright leg, the flanges supporting the ceiling panels.

The hanger clip is preferably formed from a continuous, thin, elongated strip of aluminum, or other suitable material, with a U-bend portion formed therein located approximately in the middle of the strip having a depth at least sufficient to receive that part of the horizontal flange extending on one side of the vertical leg of the overhead beam. That portion of the strip below the U-bend portion which extends vertically downwardly includes means on its lower end to receive and hold an article for display, and that portion above the U-bend is vertically upright and is adapted to be placed between the vertically upright leg of the overhead beam and the ceiling panel to hold the hanger clip securely in place.

This vertically upright portion of the clip therefore cooperates with the overhead beam and the ceiling panel to prevent the clip from inadvertently being released from the overhead beam or twisting as a result of forces imposed on the clip from the articles which depend therefrom.

Accordingly, it is an object of this invention to provide a hanger clip of the type described which is useful in displaying signs or other advertising materials, decorations and other articles from suspended ceilings in which the clip can be inexpensively manufactured, easily installed, and which will not become inadvertently disengaged from an overhead ceiling beam.

These and other objects and advantages of the invention will be apparent from the following description, the accompanying drawings and the appended claims.

DESCRIPTION OF THE PREFERRED EMBODIMENTS

Figure 1:
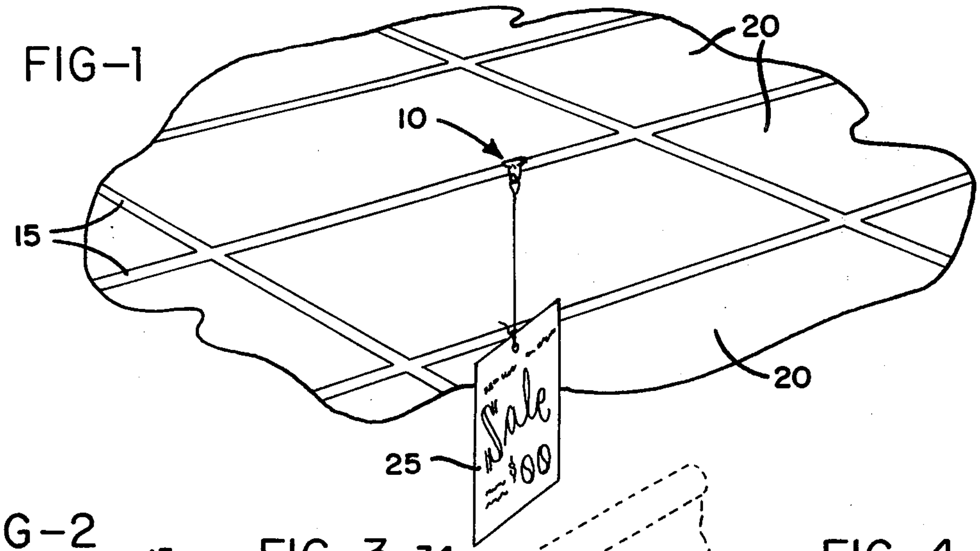
FIG. 1 is a fragmentary perspective view showing a hanger clip installed on a suspended ceiling.

Reference is now made to the drawings which show the preferred embodiments of hanger clips constructed according to this invention which are designed for the display of articles from a suspended ceiling, and particularly to FIG. 1 which shows a hanger clip 10 attached to an overhead beam 15 which supports ceiling panels 20. In FIG. 1, the hanger clip 10 is shown supporting an advertising sign 25; however, the hanger clip may also be used to support decorations or merchandise as well.

Figure 2:
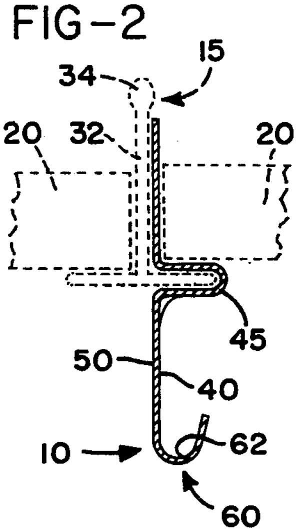
FIG. 2 is a cross section end view showing a single hanger clip installed on a suspended ceiling beam.
Figure 3:
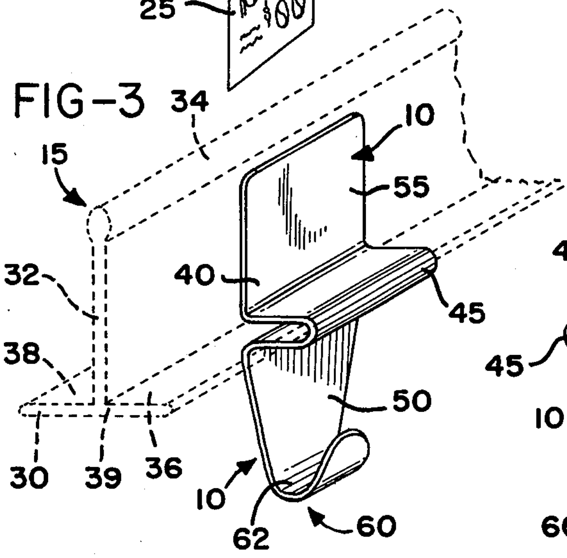
FIG. 3 is a perspective view of a single hanger clip.

Referring now to FIGS. 2 and 3, the overhead beam 15 for supporting a suspended ceiling normally includes a lower horizontal flange 30 and a vertically upright leg 32. At the uppermost part of the vertically upright leg 32 is an enlarged portion 34. The ceiling panels 20 rest on the upper surfaces 36 and 38 of the horizontal flange. The lower surface 39 is generally painted to be the same as or to complement the color of the ceiling panels 20.

The hanger clip 10 is formed from a continuous thin elongated strip 40 of metal, although a suitable plastic material might be used. The width of the strip in the preferred embodiment of the invention is approximately 1 inch. The strip is formed with a U-shaped bend 45 generally centrally of the strip, and the depth D of this bend (FIG. 3) is sufficient to receive at least that part of the horizontal flange 36 or 38 extending on one side of the vertical leg 32 of the overhead beam. This allows the hanger clip to be installed on the beam with its vertically downwardly extending portion 50 substantially directly beneath the vertically upright leg 32 of the overhead beam, and its vertically upright portion 55 placed against the vertically upright leg 32 and between that leg and the edge of the ceiling panel 20.

The length of the upwardly extending portion 55 above the U-bend 45 is such that it permits the strip 40 to abut that part of the vertical leg 32 below the enlarged portion 34, and therefore will not significantly interfere with the replacement of the ceiling panel 20 after the clip has been installed.

Once the ceiling panel 20 has been replaced, the hanger clip 10 is therefore locked into position and cannot be removed, nor will it twist, and it therefore provides a secure device to which articles can be attached without fear that the hanger clip will release from the overhead beam should the clip or the article which hangs from the clip be bumped accidentally or, in the case of an advertising sign, blown with resulting oscillation due to air conditioning and heating system drafts.

Figure 4:
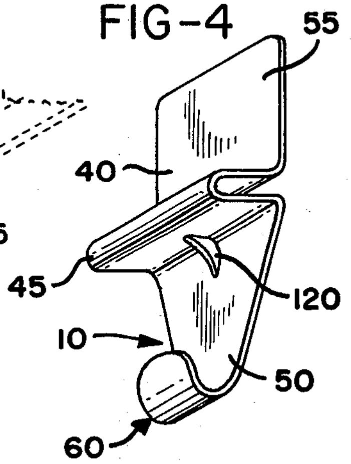
FIG. 4 is another perspective view illustrating a dimple between the U-bend portion and the downwardly extending portion of a hanger clip.

The length of the vertically downwardly extending portion 50 below the U-bend 45 in the embodiment shown in FIGS 2–4 is approximately 1 inch; but this length can be lengthened or shortened depending upon the use to which the hanger clips is to be put.

The vertically downwardly extending portion 50 includes means 60 on its lower end for holding an article for display, and in the embodiment shown in FIGS. 2–4 the means includes a hook formed by bending the strip upwardly to form a trough 62 for receiving either the articles to be displayed or means, such as a string or wire, attached to the article to be displayed.

In the embodiment shown in FIGS. 2–4, the vertically downardly extending portion 50 is preferably tapered to conserve material and to give the hanger clip a pleasing appearance.

Figure 7:
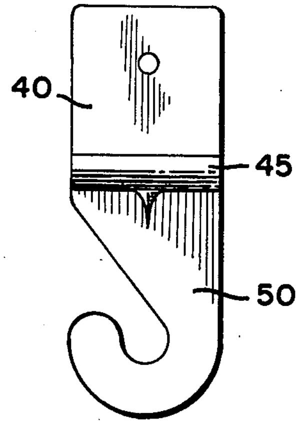
FIG. 7 shows a coplanar hook on the lower portion of the clip.
Figure 8:
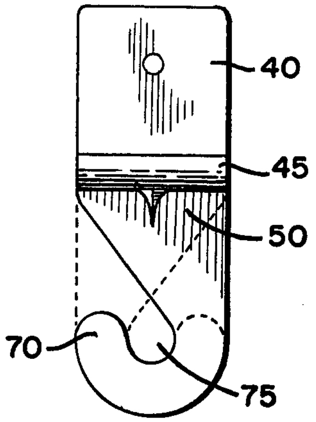
FIG. 8 shows a pair of clips with coplanar hooks arranged opposite each other.

The embodiments of the invention shown in FIGS. 7–13 show different means for holding an article for display. In FIG. 7, the holding means is a hook 70 formed in the same plane as the elongated strip by removing a portion of the strip material. FIG. 8 illustrated another embodiment wherein two hanger clips formed with coplanar hooks, as in FIG. 7, are placed on opposite sides of the overhead beam to form therebetween an opening 75 in those environments where it is desired that the article not be easily removed from the hanger clip.

Figure 9:
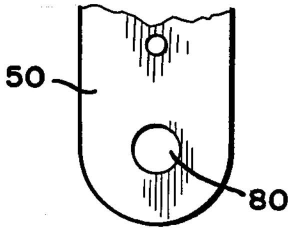
FIG. 9 illustrates a clip with a hole formed in the lower part thereof to receive an article for display.
Figure 10:
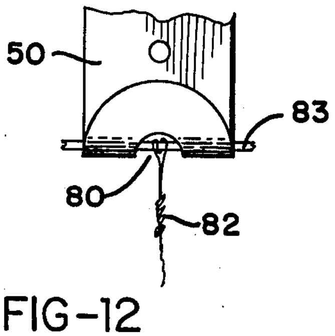
FIG. 10 shows a modification of the embodiment of FIG. 9.

FIG. 9 is another embodiment of the invention wherein a hole 80 is formed in the lower portion of the downwardly extending part of the clip through which a string or wire may be extended to hold an article for display. FIG. 10 is a modification of FIG. 9 wherein the strip is bent upwardly at the hole 80 to permit a string or wire 82 to extend downwardly from the hole from a cross bar 83 which is contained in the trough formed thereby.

Figure 11:
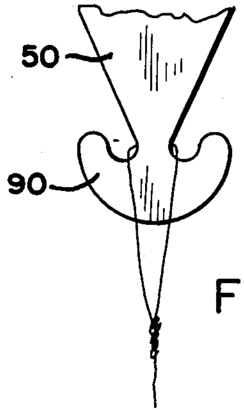
FIG. 11 shows still another embodiment employing double coplanar hooks.
Figure 12:
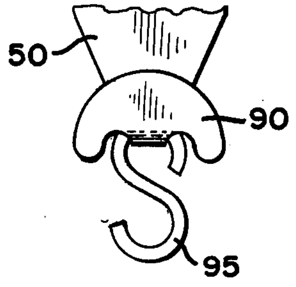
FIG. 12 shows a modification of the embodiment of FIG. 11.
Figure 13:
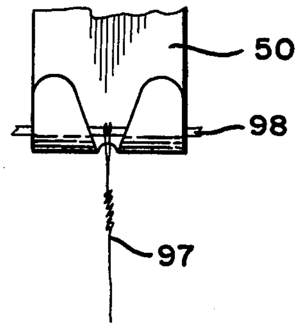
FIG. 13 illustrates another embodiment wherein the clip is bifurcated at its lower end and then bent upwardly to form a trough to receive an article for display.

FIG. 11 is another embodiment of the invention wherein the means for holding the display is a double hook 90 formed coplanar with the elongated strip. FIG. 12 is similar to FIG. 11 except that the lower end of the strip is bent upwardly to form a trough which is adapted to accept one end of an S-hook 95. In FIG. 13, the lower end of the strip is bifurcated, and then bent upwardly to form a trough having a central opening through which a string or wire 97, attached to a cross bar 98, may freely pass.

Figure 5:
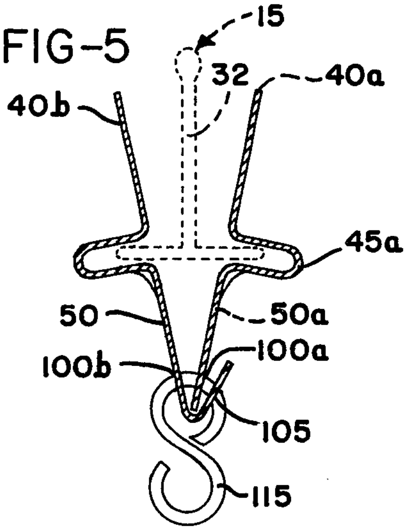
FIG. 5 is a cross sectional end view showing a double hanger clip installed on a suspended ceiling beam.
Figure 6:
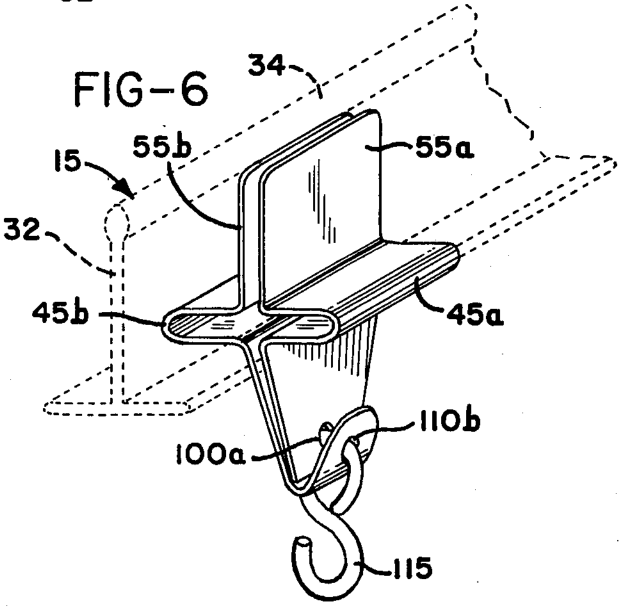
FIG. 6 is a perspective view of the double clip embodiment of the invention.

A second embodiment of the invention is shown in FIGS. 5 and 6, and in this embodiment, two complementary hanger clips are installed on opposite sides of an overhead beam 15. Each hanger clip is formed from a continuous elongated strip of metal (**40*a* and 40*b*), and each includes means defining a U-bend (45*a* and 45*b*) located in an intermediate portion of the strip having a depth at least sufficient to receive that part of the horizontal flange 30 extending to one side of the vertical leg 32** of the overhead beam.

In the vertically downwardly extending portions **50*a* and 50*b* of each strip, an opening 100*a* and 100*b* is formed, and thus openings are directly opposite each other when the hanger clips are properly installed on an overhead beam. As shown, the strip 40*b* includes a tail portion 105 which is bent upwardly and in which is formed an opening 110*b*. One end of an S-hook 115 is placed through the openings 100*a*, 100*b* and 110*b*** to secure the strips together, and the other end thereof provides means for supporting an article for display.

The vertically upright portions **55*a* and 55*b* of each strip are designed to be placed against the vertically upright leg 32 of the overhead beam without interference with the enlarged portion 34. Therefore, each clip bears against the upper surfaces 36 and 38 of the overhead beam, and the vertically upright portions 55*a* and 55*b*** cooperate with the overhead beam and the ceiling panels, when installed, to prevent the clips from twisting or from being inadvertently knocked loose from the overhead beam.

In the preferred embodiments of the invention, each continuous thin elongated strip is preferably formed of aluminum and has a length approximately three times its width; and in one embodiment, it is approximately 1 inch wide and 3½ inches in length before it is formed into the shape shown in the drawings. In some cases, it may be desired to include dimple means 120 between the downwardly extending portion 50 and the lower section of the U-bend 45, as shown in FIG. 4, for stiffening the strip thereby to resist unbending due to the weight of an article attached to the hook at the lower end 60.

To install the hanger clips, the ceiling panel is raised above the overhead beam, the clip is placed with the U-bend portion of the clip over the horizontal flange, and then the ceiling panel is returned to its original, seated position. Thus, it may be seen that the clip can be installed with one hand.

While the forms of hanger clips herein described constitute preferred embodiments of this invention, it is to be understood that the invention is not limited to these precise forms of clips, and that changes may be made therein without departing from the scope of the invention which is defined in the appended claims.

What is claimed is:

1. A hanger clip for displaying an article from a suspended ceiling of the type which includes a plurality of ceiling panels installed on overhead beams each having a horizontal flange and a vertically upright leg, the clip comprising a continuous thin elongated strip including means defining a U-bend portion located generally centrally of said strip having a depth at least sufficient to receive that part of the horizontal flange extending on one side of the vertical leg of the overhead beam, a vertically downwardly extending portion including means on the lower end thereof for holding an article for display, and a vertically upright portion adapted to be placed between the vertically upright leg of the overhead beam and the ceiling panel for holding said hanger clip securely in place.

2. The hanger clip of claim 1 wherein said continuous elongated strip is formed from a thin sheet of metal.

3. The hanger clip of claim 1 wherein said means at the lower end of said vertically extending portion for holding an article for display includes a means defining a hook formed by bending the end of the strip upwardly to form a trough for receiving the article or a means for supporting the article to be displayed.

4. The hanger clip of claim 1 wherein said means on the lower end of said downwardly extending portion for holding an article for display includes means defining a hook formed by removing a portion of the material forming said strip.

5. A hanger clip for displaying an article from a suspended'ceiling of the type which includes a plurality of ceiling panels installed on overhead beams each having a horizontal flange and a vertically upright leg, said clip comprising a pair of continuous elongated strips each including means defining a U-bend portion located generally centrally of said strip having a depth at least sufficient to receive that part of the horizontal flange extending to one side of the vertical leg of the overhead beam, a vertically downwardly extending portion including means defining an opening in a lower portion thereof, and a vertically upright portion adapted to be placed between the vertically upright leg of the overhead beam and a ceiling panel to hold each strip securely in place on said overhead beam, means placed through said openings in the downwardly extending portions of each strip for holding the lowermost portions of said strip' together and said strips opposite each other, and means associated with said strip for supporting an article for display.

6. A hanger clip for displaying an article from a suspended ceiling of the type which includes a plurality of ceiling panels installed on overhead beams each having a horizontal flange and a certically upright leg, said clip comprising a pair of continuous elongated strips each including means defining a U-bend portion located generally centrally of said strip having a depth at least sufficient to receive that part of the horizontal flange extending to one side of the vertical leg of the overhead beam, a vertically downwardly extending portion including means defining an opening in a lower portion thereof, and a vertically upright portion adapted to be placed between the vertically upright leg of the overhead beam and a ceiling panel to hold each strip securely in place on said overhead beam, the vertically downwardly extending portion of the strip including at its lower end means defining a hook formed by bending the end of the strip upwardly to form a trough and tail, the vertically extending portion of the other strip being received into said trough, and means defining openings in the lower portion of both said strips and said tail directly opposite each other, means placed through said openings in the downwardly extending portions of each strip for holding the lowermost portions of said strip together and said strips opposite each other, including an S-hook having one end placed through said openings and the other end providing means for supporting an article for display.

7. A hanger clip for displaying an article from a suspended ceiling of the type which includes a plurality of ceiling panels installed on overhead beams each having a horizontal flange and a vertically upright leg, the clip comprising a continuous thin elongated strip of metal having a length approximately three times its width and having formed therein.

means defining a U-bend portion located generally centrally of said strip having a depth at least sufficient to receive that part of the horizontal flange extending on one side of the vertical leg of the overhead beam, a vertically downwardly extending portion positioned substantially directly beneath the vertically upright leg of the overhead beam and including a hook formed on the lower end thereof by bending the end of the strip upwardly to form a U-shaped trough for receiving an article for display, dimple means between said vertically downwardly extending portion and the lower section of said U-bend for stiffening said strip and thereby to resist unbending thereof due to the weight of an article attached to said lower end, and a vertically upright portion adapted to be placed between the vertically upright leg of the overhead beam and the ceiling panel for holding said hanger clip securely in place when the ceiling panel is installed.

* * * * *